(12) United States Patent
Lieberstein

(10) Patent No.: US 10,813,819 B2
(45) Date of Patent: *Oct. 27, 2020

(54) URN AND PLANTER COMBINATION

(71) Applicant: David Lieberstein, Novato, CA (US)

(72) Inventor: David Lieberstein, Novato, CA (US)

( * ) Notice: Subject to any disclaimer, the term of this patent is extended or adjusted under 35 U.S.C. 154(b) by 61 days.

This patent is subject to a terminal disclaimer.

(21) Appl. No.: 16/236,235

(22) Filed: Dec. 28, 2018

(65) Prior Publication Data

US 2019/0209410 A1 Jul. 11, 2019

Related U.S. Application Data

(63) Continuation-in-part of application No. 15/867,127, filed on Jan. 10, 2018, now Pat. No. 10,165,733.

(51) Int. Cl.
| | |
|---|---|
| *A61G 17/08* | (2006.01) |
| *A01G 22/67* | (2018.01) |
| *A01G 24/20* | (2018.01) |
| *A01G 9/02* | (2018.01) |
| *A61G 17/04* | (2006.01) |

(52) U.S. Cl.
CPC ............. *A61G 17/08* (2013.01); *A01G 9/028* (2013.01); *A01G 22/67* (2018.02); *A01G 24/20* (2018.02); *A61G 17/045* (2016.11)

(58) Field of Classification Search
CPC .. A61G 17/08; A61G 17/0136; A61G 17/007; A61G 17/0076; A01G 9/028; A01G 24/20; A01G 22/67; E04H 13/008; A47G 7/025
USPC .................. 27/1; 47/66.6, 66.1, 66.5, 85, 86
See application file for complete search history.

(56) References Cited

U.S. PATENT DOCUMENTS

| | | | | |
|---|---|---|---|---|
| 4,977,652 | A * | 12/1990 | Graham | E04H 13/006 27/1 |
| 5,029,373 | A * | 7/1991 | Raymond | A61G 17/08 27/1 |
| 5,815,897 | A * | 10/1998 | Longstreth | A61G 17/08 27/1 |
| 6,092,330 | A * | 7/2000 | Pratt | A47G 7/06 27/30 |
| 6,112,382 | A * | 9/2000 | Parker | A61G 17/08 27/1 |
| 6,516,501 | B2 * | 2/2003 | Vazquez-Perez | A01C 1/04 27/1 |
| 6,854,165 | B1 * | 2/2005 | Parker | A61G 17/08 27/1 |
| 7,610,663 | B2 * | 11/2009 | Johnson, Sr. | E04H 13/008 27/1 |
| 7,904,998 | B2 * | 3/2011 | Motz | A61G 17/045 206/423 |
| 8,943,657 | B1 * | 2/2015 | Perry | A61G 17/045 27/1 |
| 9,872,441 | B1 * | 1/2018 | Lieberstein | A01G 9/028 |
| 2015/0264869 | A1 * | 9/2015 | Steiner | A01G 9/028 47/66.6 |
| 2016/0000002 | A1 * | 1/2016 | Bibaud | A01G 24/00 47/56 |
| 2016/0296403 | A1 * | 10/2016 | Brewer | A61G 17/08 |

\* cited by examiner

*Primary Examiner* — William L Miller
(74) *Attorney, Agent, or Firm* — Law Office of Christopher Peil

(57) ABSTRACT

An urn and planter combination provides a divided container that both holds the ashes resulting from cremation and a living plant or cut flowers.

8 Claims, 11 Drawing Sheets

URN AND PLANTER COMBINATION

CROSS REFERENCE TO RELATED APPLICATIONS

This Application is a continuation-in-part of U.S. patent application Ser. No. 15/867,127, filed Jan. 10, 2018;

U.S. patent application Ser. No. 15/867,127 is a continuation of U.S. patent application Ser. No. 15/530,992, filed Apr. 4, 2017; and U.S. patent application Ser. No. 15/530,992 claims benefit of U.S. provisional patent application Ser. No. 62/390,679, filed Apr. 7, 2016, all of which Applications are incorporated herein in their entireties.

BACKGROUND

Technical Field

This disclosure relates generally to the field of cremation urns and planters and more specifically to an urn and planter combination.

Technical Background

It is a common practice to cremate the remains of a person or pet when that person or pet dies. The resulting ashes are often put on an urn to be placed in a spot of honor in a house or office. Alternately, some people elect to disperse the ashes in a natural environment so that the ashes may mingle and become one with the environment. As an extension of this idea, it would be useful to have an urn that has the capability of connecting directly with a container that can hold a plant or bonsai tree, where the ashes in the urn can mingle with the ashes thereby infusing the plant or tree with elements found in the person or pet's ashes.

The idea of placing the remains of a pet or person in close proximity to a living plant or tree has been considered in the following patents:

U.S. Pat. No. 4,977,652 by Graham shows the idea of placing remains under a tree. But this idea is not suitable for indoor use.

U.S. Pat. No. 5,029,373 by Raymond shows an urn that has an upper soil holding part and a lower ash holding part. However, there is no provision for the ash material to mingle with the soil material.

U.S. Pat. No. 6,112,382 by Parker et al. shows a planter having a false bottom that can hold ashes, but again, there is no provision for the ash material to mingle with the soil.

U.S. Pat. No. 8,943,657 by Perry et al shows a planter having a side cavity allowing an urn to next into the side cavity, but again, there is no provision for the ash material to mingle with the soil.

Therefore there is a deficiency in the prior technology in that none of the prior designs allows the ashes of a deceased person or pet to commingle with the soil of a plant or bonsai tree for use in an indoor setting. The commingling of the ash and soil gives the owner of the combination urn and planter the comfort that some of the elements of the deceased are being used to directly feed the plant or tree and thereby having material of the deceased literally incorporated into the plant or tree.

SUMMARY

An urn and planter combination provides a divided container that both holds the ashes resulting from cremation and a living plant or cut flowers.

DETAILED DESCRIPTION

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
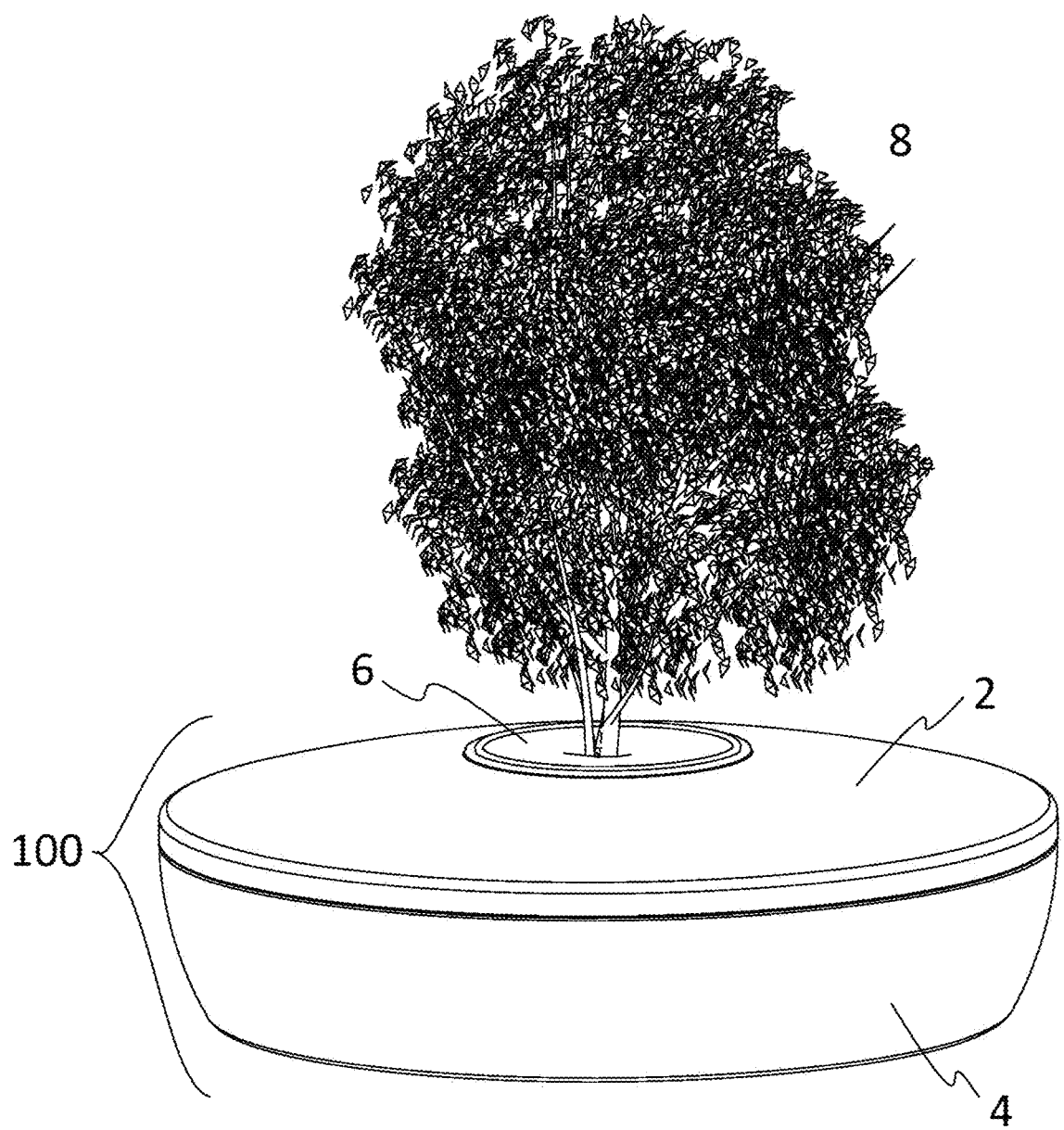
FIG. 1 is a perspective view of an urn and planter combination.

Referring now to FIG. 1 we see a perspective view of the combination urn and plant holder 100 holding a bonsai tree 8. The outer housing is comprised of a main body 4 and a main lid 2. In the preferred embodiment, the outer housing 2, 4 is made of metal or ceramic, but may be made of other materials such as wood or plastic.

Figure 2:
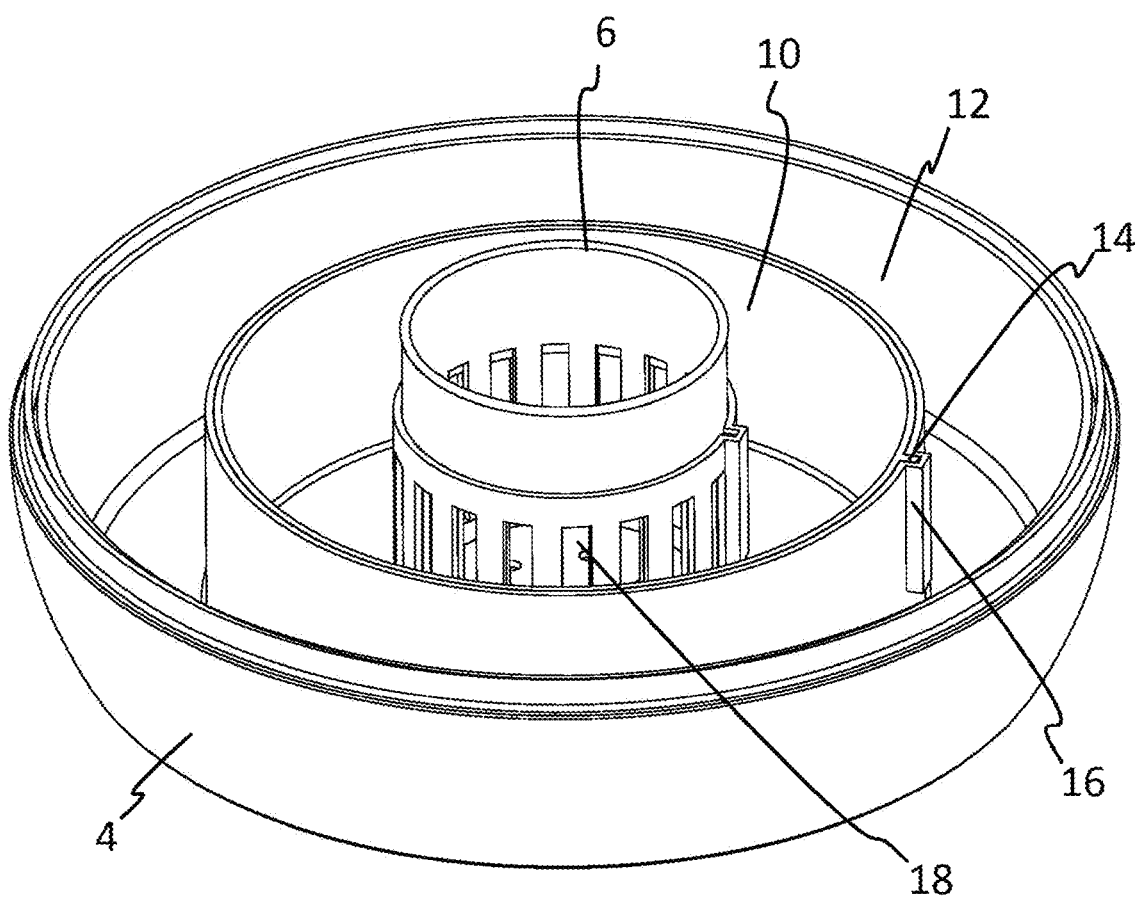
FIG. 2 is a perspective view of the interior of the urn and planter combination of FIG. 1.

FIG. 2 is a perspective view of the combination urn and planter 100 with the main lid 2 removed. A central cup 6, formed by a base plate and surrounding wall, can be filled with soil and hold a plant or bonsai tree. A strip of thin flexible material such as paper or felt 17 covers the interior wall of the cup 6 to help hold the soil in, but thin and porous enough to let the roots from the plant held in the central cup 6 migrate into the first concentric ring 10. The first concentric ring 10 is made of an inner wall, base plate and outer wall. The inner wall of the first concentric ring 10 includes vertical slots 18 which match similar slots located in the wall of the central cup. The slots of the central cup are aligned with the slots of the first ring 10 by means of an outwardly facing vertical rib 14 in cup 6 engaging a channel 16 in the inner wall of first concentric ring 10. The first concentric ring 10 holds a combination of soil and ashes that have been gathered from the remains of a person or pet. The first concentric ring 10 also includes a flexible strip of paper or porous material 19 that surrounds the inner wall of the ring 10. When the plant or tree in the central cup matures, the roots of the plant or tree will migrate through the slots 18 in the central cup and slots of the first concentric ring 10 to the soil and ash contained within the first ring 10. In this way, the elements of the ashes of the deceased will be taken up by the roots of the tree or plant thereby causing the tree or plant to embody some of the elements of the deceased. The second concentric ring 12 contains ashes only, so that the urn 100 can retain the complete contents of a person's remains which is approximately one hundred cubic inches of ash material.

Although the shape of the cup, rings and outer housing is shown as cylindrical in this embodiment, the shape can be other concentric shapes such as square, a hexagon or an octagon. Additionally, the height of the central cup shape 6 and outer housing 2, 4 can rise significantly to create a more vertical, vase-like appearance.

Figure 3:
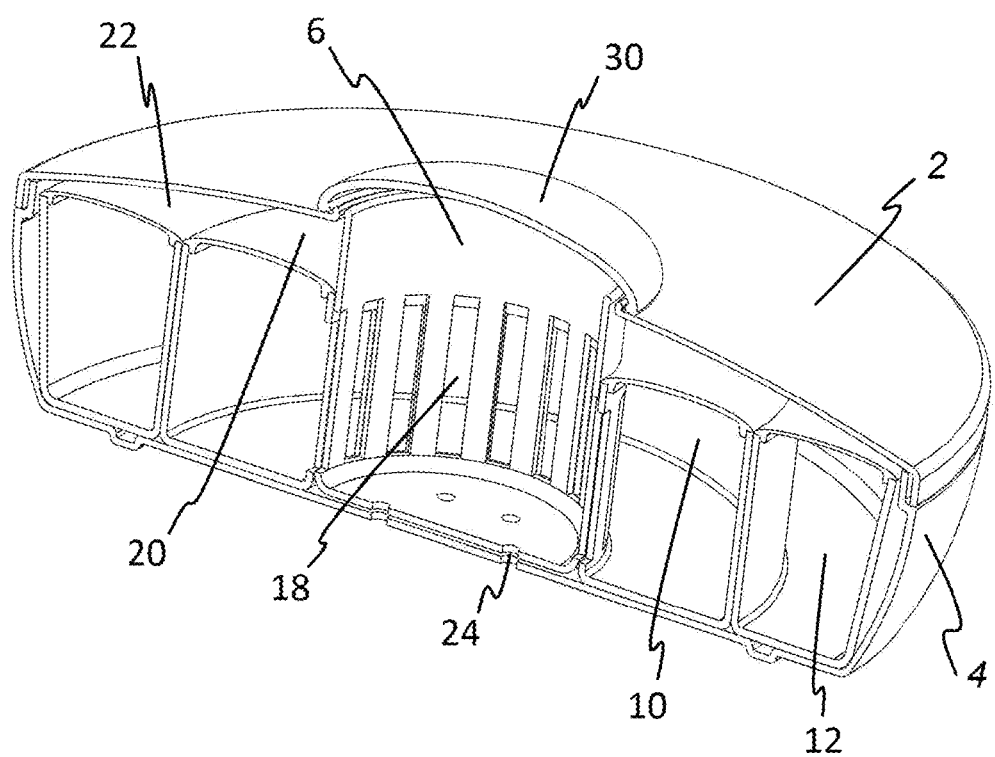
FIG. 3 is a side section view of the of the urn and planter combination of FIG. 1.
Figure 5:
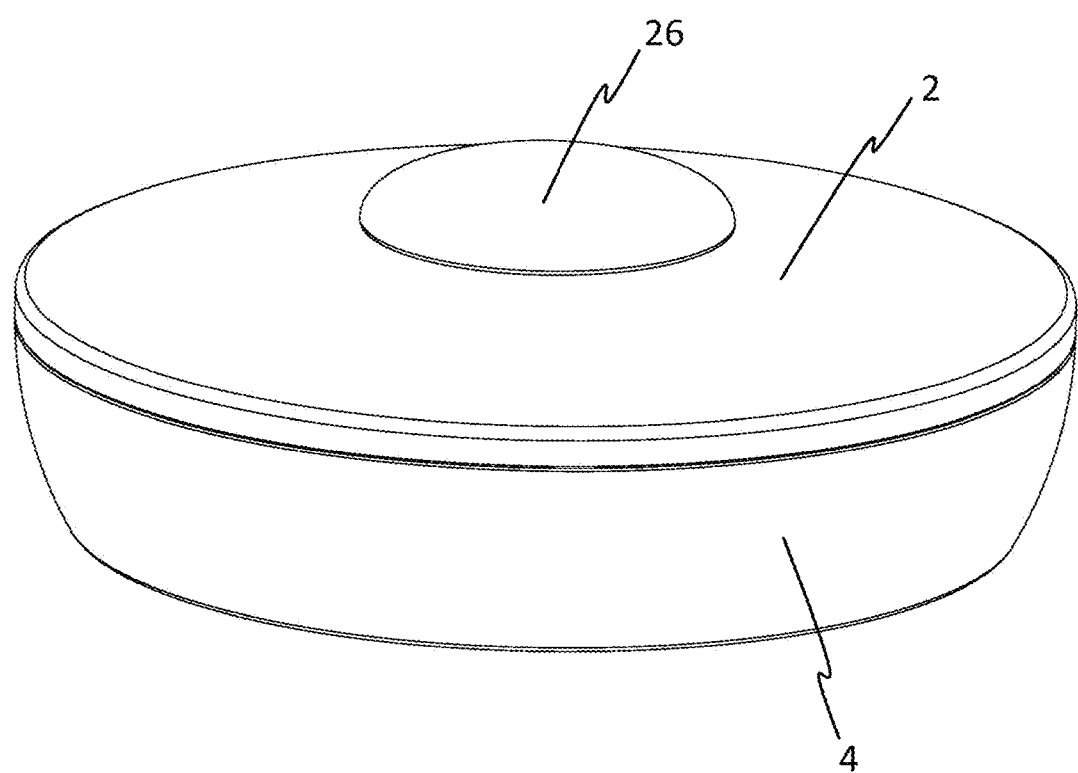
FIG. 5 is a perspective view of the urn and planter combination of FIG. 1 with the secondary central top lid in place.
Figure 6:
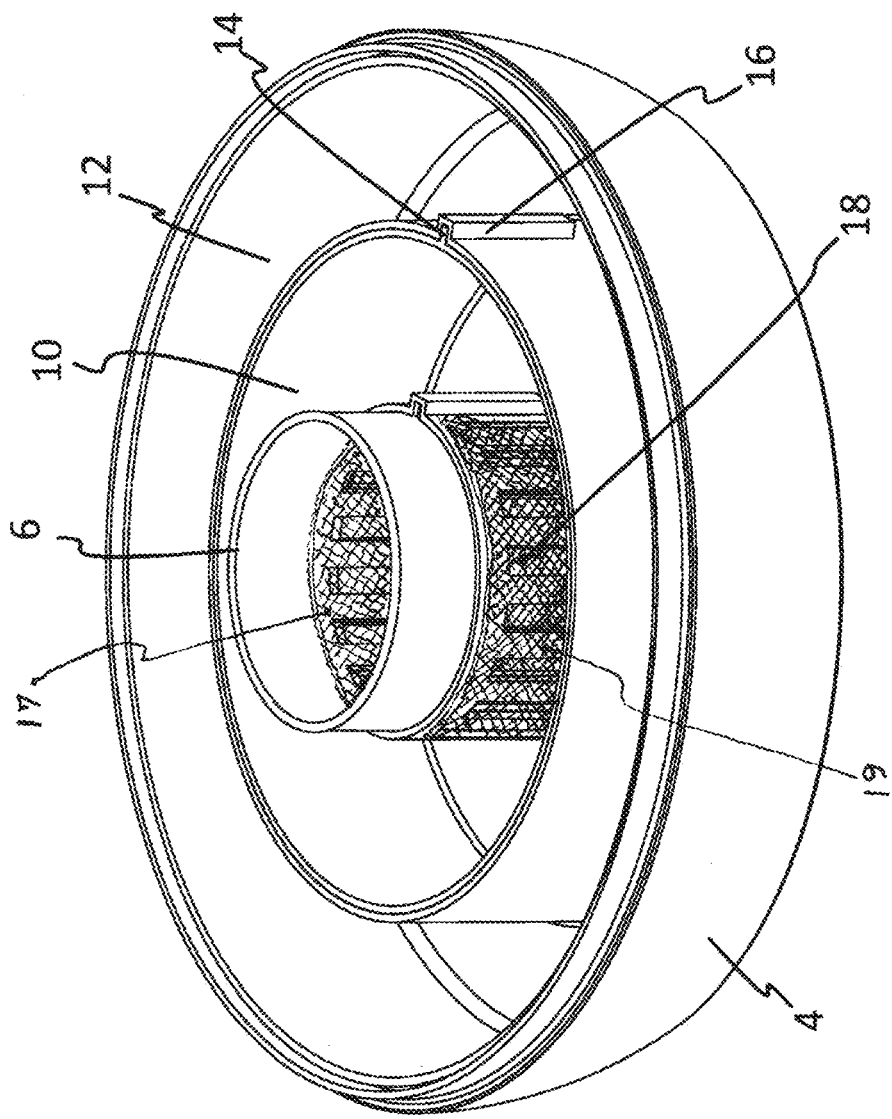
FIG. 6 is a perspective view of the interior of the urn and planter combination of FIG. 1 showing a central cup partition sheet and a first ring partition sheet.

FIG. 3 is a side section view of the urn planter combination 100. The first and second rings 10, 12 each have lids 20, 22 that can hold the contents without spilling during transport or storage. The main lid 2 includes an aperture that lets the central cup 6 protrude through. The main lid 2 also includes a neck 30 rising from the central aperture that allows a secondary top lid 26 to be installed, as shown in FIG. 5. This secondary lid 26 can be used during transport or if no plant is being grown in the central cup. Holes 24 in the base of central cup 6 and main housing 4 allow excess moisture to migrate out of the urn thereby reducing the chance of excess liquid buildup within the urn 100. A ring on the underside of the main housing 4 allows excess moisture to escape from the bottom of the outer housing 2 and inner cup 6.

Optionally, an additional central cup can be housed within cup 6. The additional cup would be a standard flower pot and not contain slots for the migration of roots. In this way, a person can elect to use the surrounding rings for the ash remains and have the additional cup be removable for replanting in the future.

Figure 4:
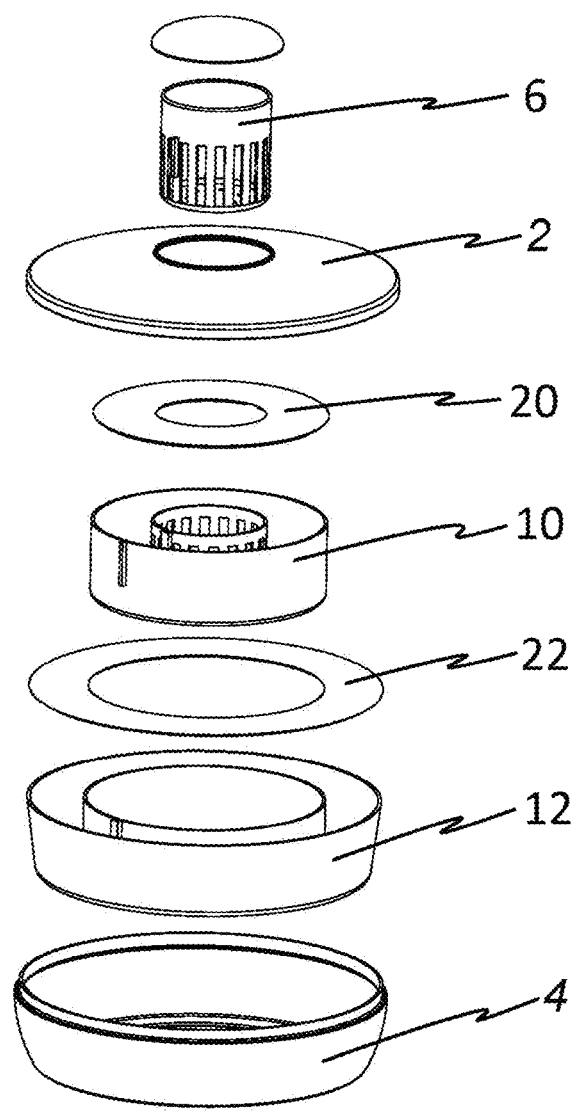
FIG. 4 is an exploded view of the urn and planter combination of FIG. 1.

FIG. 4 is an exploded view of the invention. All components can be seen in their concentric relation to each other. In the preferred embodiment, the rings 10, 12 and lids 22, 20 and central cup 6 are all made of injection molded plastic; preferably environmentally friendly recycled plastic or plastic made from corn based materials.

FIG. 5 is a perspective view of the invention 100 with the central secondary lid 26 in place, making the unit 100 ready for shipping from the crematorium to the plant or tree installation site. The first and second ring 10, 12 are prepared with soil and ash at the crematorium and then installed in the outer housing 2. The plant or tree can be installed at a florist shop or other suitable location, or the end user can install the bonsai tree or plant at their home or office.

The urn and planter combination as described hereinabove, is configured to allow the commingling of ash and soil to give the owner of the combination urn and planter the comfort that some of the elements of the deceased are being used to directly feed the plant or tree, thus perpetuating the cycle of life.

However, many people merely wish to have a funerary urn that may serve as a planter or a vase for flowers in addition to being a receptacle for the cremated remains of a family member or close friend, while not allowing co-mingling of the deceased's cremated remains with the planting medium.

Figure 7:
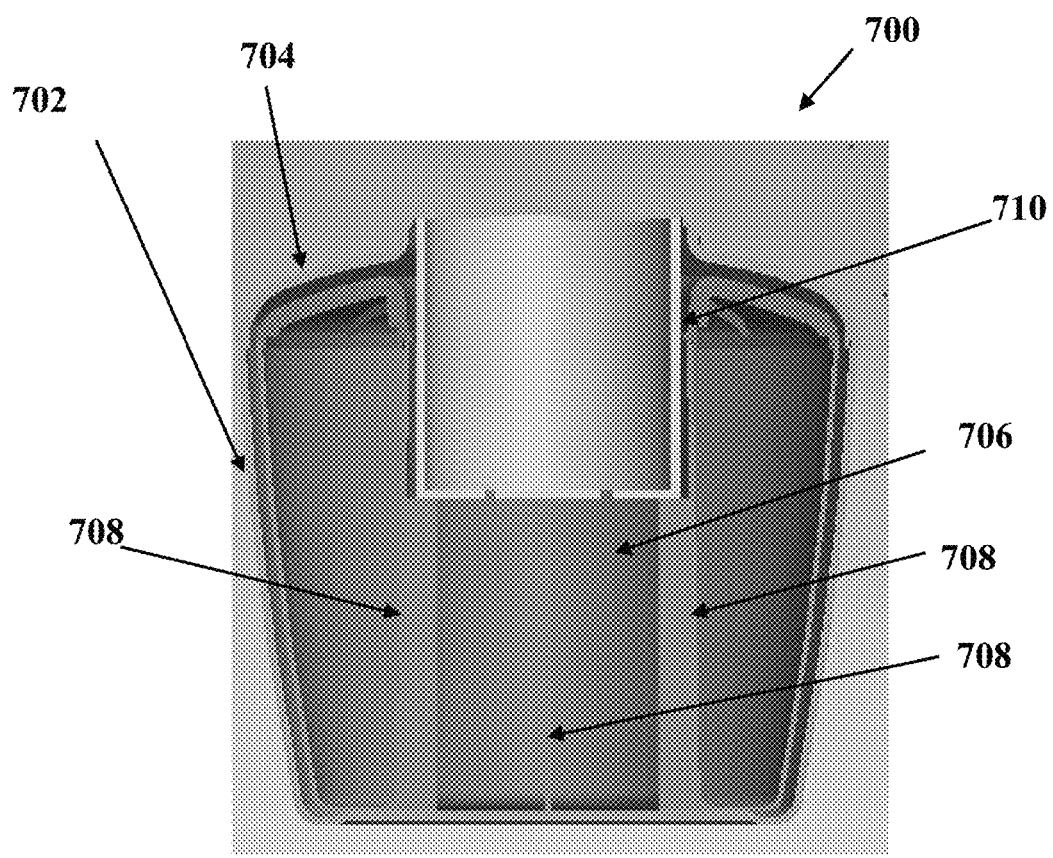
FIG. 7 illustrates a further embodiment of an urn and planter combination.

FIG. 7 provides a further embodiment 700 in which a funerary urn is provided in the shape of an outer ring 702.

In embodiments, the outer ring 702 defines a central bore 706, into which a planter 710, such as a flower pot, or a vase for flowers 1100 may be inserted. In embodiments, the funerary urn includes a cover 704 for the outer ring 702. In embodiments the lid includes a central aperture for the plant and/or flowers.

In embodiments, protruding from the wall of the central bore 706 are a plurality of vertical ribs 708 which provide support for the planter 710. As shown, the planter may rest on the top surfaces of the ribs, in effect, suspended within the bore, so that space remains beneath the planter and the bottom opening of the outer ring.

As shown, the ribs 708 may be four in number. However, the number of ribs shown is merely an example and is not intended to be limiting.

Alternately, the urn 700 may be used as a flower vase 1100. In embodiments a flower vase is provided in which the size of the portion of the vase which occupies the space defined by the rubs is stepped down in order to fit easily into the space, while the vertical edges of the ribs provide vertical support for the vase.

In embodiments, the funerary urn 700 and the stepped-down vase may be provided as a kit.

Figure 8:
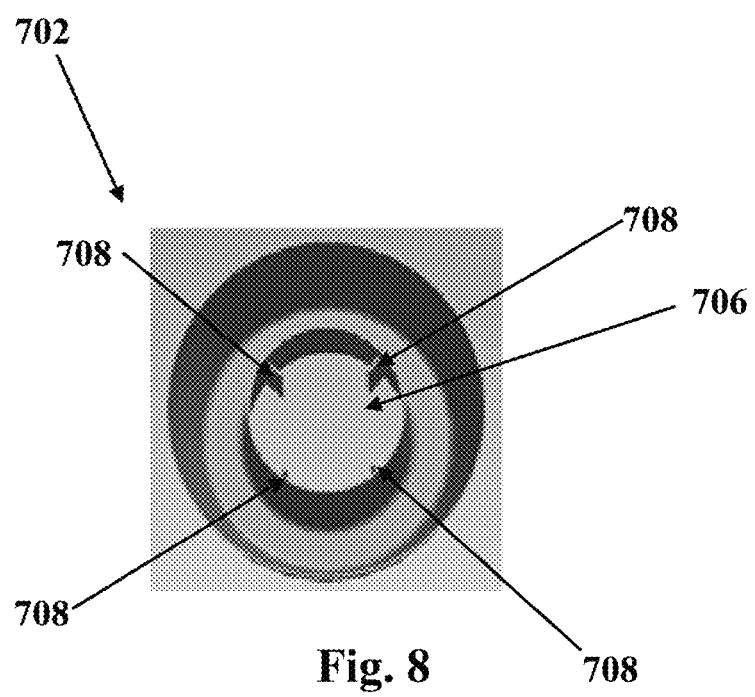
FIG. 8 illustrates a central bore of an outer ring of the urn and planter combination of FIG. 1 and showing support flanges for a planter.

FIG. 8 provides an illustration of the outer ring 702, clearly showing the central bore 706 and the flanges 708.

Figure 9:
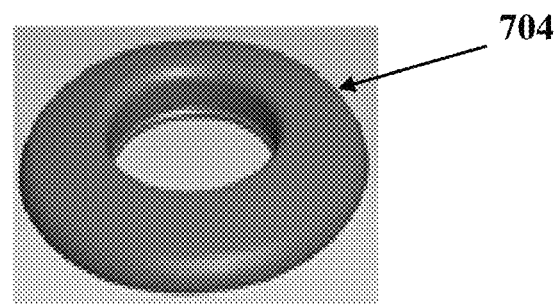
FIG. 9 provides an illustration of the cover 704 for the outer ring 702.

FIG. 9 provides an illustration of the cover 704 for the outer ring 702.

Figure 10:
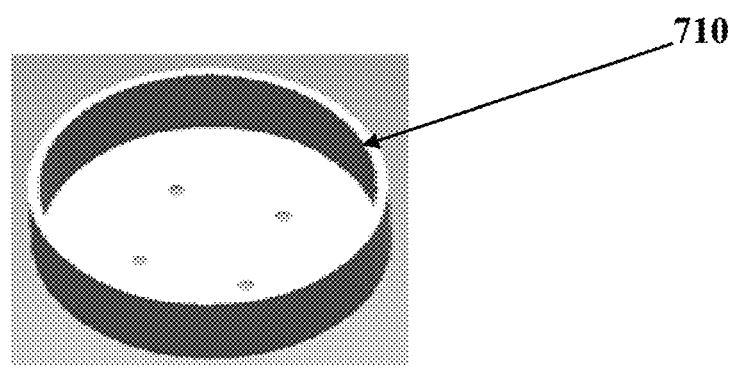
FIG. 10 provides an illustration of the planter for use with the urn.

FIG. 10 provides an illustration of the planter 710.

Figure 11:
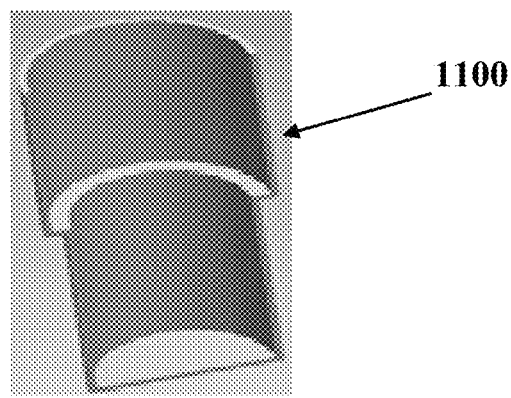
FIG. 11 provides an illustration of a vase for use with the urn.

FIG. 11 provides an illustration of the vase 1100.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

The invention claimed is:

1. A funerary urn/planter combination comprising:
   a ring-shaped funerary urn, the ring shape defining a central bore;
   a plurality of vertical ribs integral with a wall of the central bore, the ribs positioned at regular intervals along the circumference of the central bore to provide secure supports for a container for a live plant or flowers.

2. The urn/planter combination of claim 1, the plurality of ribs including horizontal top surfaces to support the container for a live plant or flowers within the central bore such that there remains empty space between an underside of the container for a live plant or flowers and a bottom opening of the ring-shaped funerary urn.

3. The urn/planter combination of claim 1, wherein the container for a live plant or flowers is vertically supported within the bore by vertical edges of the plurality of vertical ribs.

4. The urn/planter combination of claim 3, wherein the external shape of the container for a live plant or flowers is stepped down in order to easily fit into a space defined by the vertical ribs.

5. The urn/planter combination of claim 1, further comprising a cover for the ring-shaped funerary urn, the cover defining a central aperture for the live plant or the flowers.

6. The urn/planter combination of claim 5, wherein a circumferential edge of the cover fits tightly with a circumferential edge of the funerary urn.

7. The urn/planter combination of claim 1, wherein the funerary urn is fabricated from any of a metal, a polymer and a ceramic material.

8. A container that holds both of ashes resulting from cremation of a decedent and a living plant or bonsai tree comprising:
- a first compartment for containing the living plant with soil;
- at least one additional compartment in which the ashes of the decedent and soil co-mingle; and
- a plurality of openings communicating between said first compartment and said at least one additional compartment and providing a pathway for plant roots to migrate between the first and the at least one additional compartment;
- an inner central cup that fits within said first compartment, wherein said inner central cup retains the plant without engaging the ashes or soil of the first or at least one additional compartments.

\* \* \* \* \*